United States Patent [19]

Deligny

[11] Patent Number: 4,693,137

[45] Date of Patent: Sep. 15, 1987

[54] MECHANICAL CONTROL BY CABLE WITH AUTOMATIC ADJUSTMENT

[75] Inventor: Jean Deligny, Le Mans, France

[73] Assignee: Société des Câbles du Mans, Le Mans, France

[21] Appl. No.: 827,129

[22] Filed: Feb. 6, 1986

[30] Foreign Application Priority Data

Feb. 13, 1985 [FR] France ................ 85 02047

[51] Int. Cl.$^4$ .............................................. F16C 1/22
[52] U.S. Cl. ........................ 74/501.5 R; 192/111 A;
188/196 R
[58] Field of Search ............ 74/501.5 R, 500.5, 502.4;
192/111 A; 188/196 R, 196 B, 196 V

[56] References Cited

U.S. PATENT DOCUMENTS

| | | | |
|---|---|---|---|
| 2,489,163 | 11/1949 | Schwimmer | 74/501.5 |
| 2,788,095 | 4/1957 | Brooks | 188/196 B |
| 3,333,660 | 8/1967 | Swift | 188/196 B |
| 3,651,896 | 3/1972 | Fannin | 188/196 B |
| 4,057,135 | 11/1977 | Mori | 192/111 A |
| 4,304,322 | 12/1981 | Beccaris | 188/196 B |
| 4,344,518 | 8/1982 | Gilmore | 192/111 A |
| 4,378,713 | 4/1983 | Haskell et al. | 74/501.5 R |
| 4,420,988 | 12/1983 | Deligny | 74/501.5 R |
| 4,464,950 | 8/1984 | Deligny | 74/501.5 R |

FOREIGN PATENT DOCUMENTS

| | | | |
|---|---|---|---|
| 0120616 | 10/1984 | European Pat. Off. . | |
| 671006 | 1/1939 | Fed. Rep. of Germany | 188/196 B |
| 1226477 | 7/1960 | France | 188/196 B |
| 96616 | 1/1961 | Netherlands | 188/196 R |
| 84-01196 | 3/1984 | PCT Int'l Appl. | 74/501.5 R |

Primary Examiner—Gary L. Smith
Assistant Examiner—Rodney M. Lindsey
Attorney, Agent, or Firm—Larry J. Palguta; Ken C. Decker

[57] ABSTRACT

The locking device, situated between telescopic inner and outer ferrule structure (10, 12) of the cable conduit, consists of jaw structures (21) having external teeth (26) which cooperate with indentations (15) formed on an inside wall (14) of the outer ferrule structure (12), and internal ramp surfaces (27) which cooperate with a cam surface (11) formed on the inner ferrule structure (10). The jaws (21) are advantageously carried by a cage (16) connected to a control component (24) which is connected to the cable by frictional engagement.

8 Claims, 3 Drawing Figures

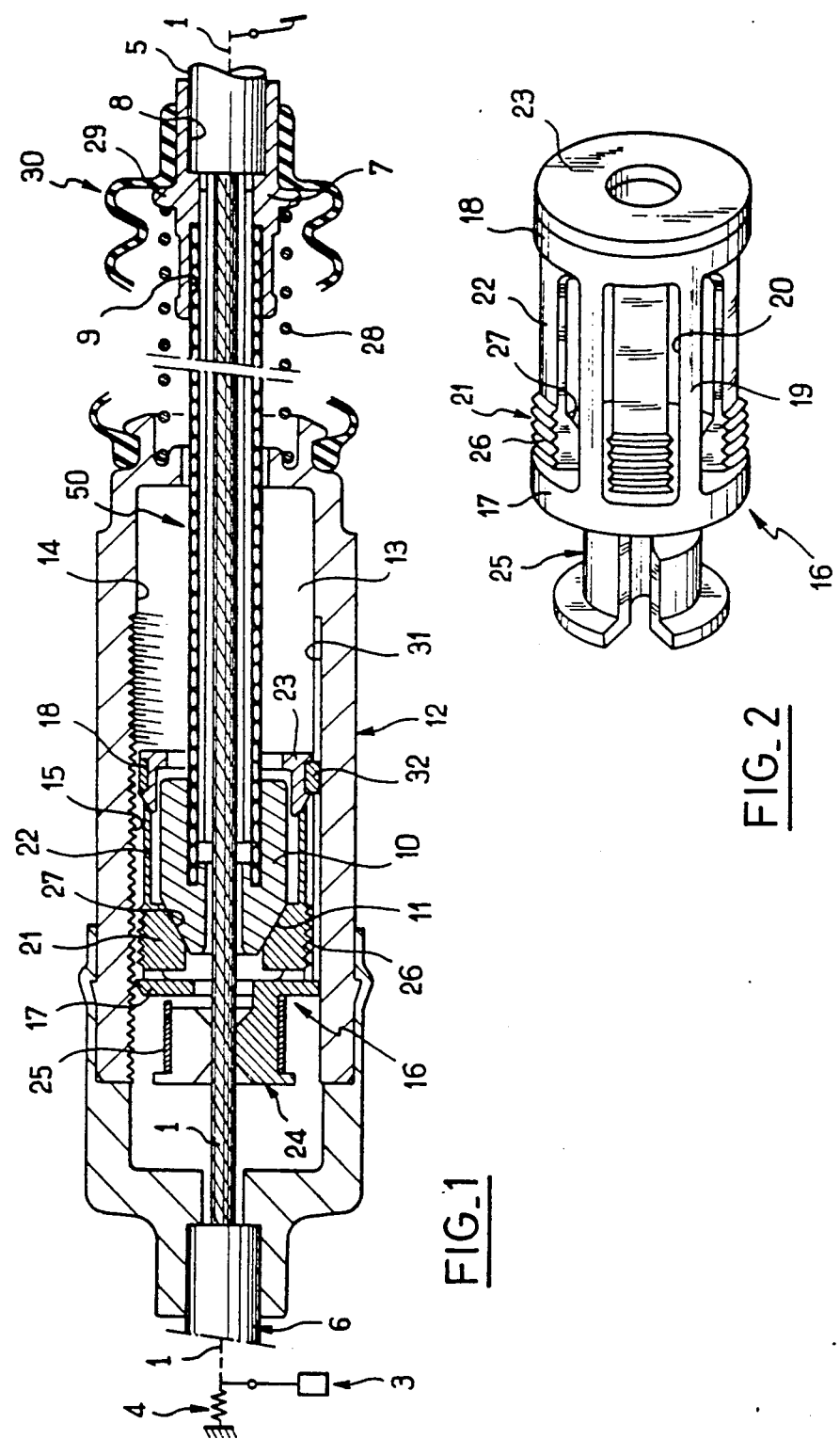
FIG_1
FIG_2

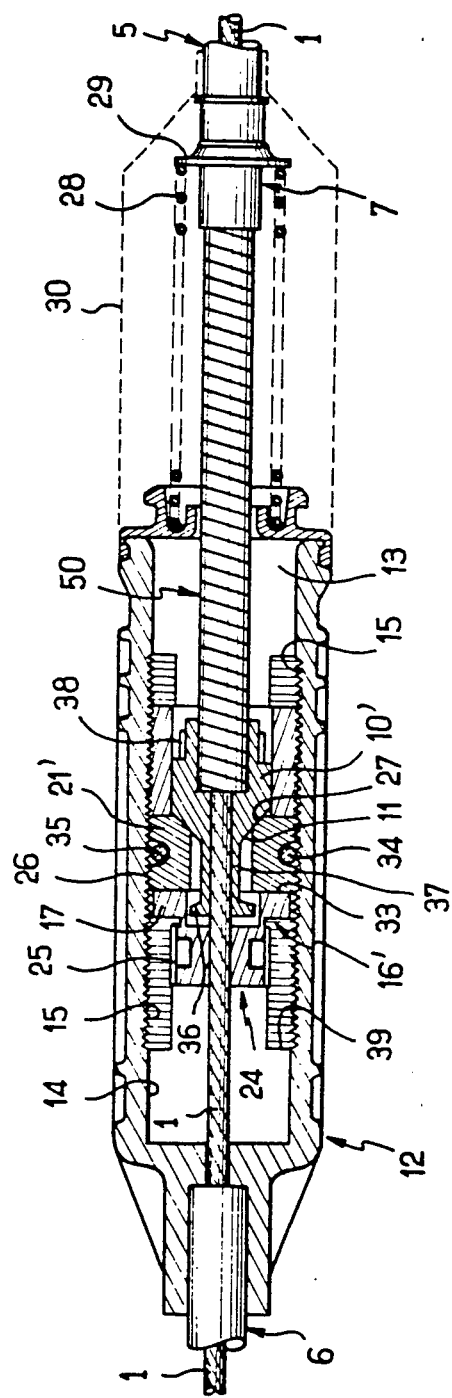
FIG_3

MECHANICAL CONTROL BY CABLE WITH AUTOMATIC ADJUSTMENT

The present invention concerns mechanical controls by a cable sliding in a shielding conduit, including an automatic adjustment device for the recovery of operational play, more particularly for the control of the friction clutch of a motor vehicle, of the type comprising a releasable locking device which is capable of firmly interconnecting together selectively, during operation of the mechanical control, an outer ferrule structure and an inner ferrule structure which is firmly fixed to one end of the sheathing conduit and is housed telescopically in the outer ferrule structure, the two ferrule structures being biased apart axially relative to one another, the locking device including disengageable radially expandable locking means arranged between the inner and outer ferrule structures and adapted for cooperation with a cam surface formed on one of said ferrule structures and movable between a locked position firmly interconnecting the ferrule structures together, and an unlocked position under the action of a control member frictionally engaging the cable.

A cable control of this type is described in U.S. Pat. No. 4,464,950, the contents of which is assumed to be incorporated herewith for reference. In said known control, the locking means consist of metal clamping balls cooperating between the cam surface on one of the ferrule structures and a smooth tubular wall, also made of metal, of the other ferrule structure, according to a costly arrangement requiring, for the ferrule structures, bulky metal structures owing to the point-contact clamping by the balls, this point-contact clamping being metal to metal and capable giving rise, under certain conditions of use, to a false locking which is not sure and is not detected as such, and capable of undesiderable slipping.

One object of the present invention is to propose a mechanical control of the type mentioned above of reduced costs of manufacture, mounting and storage, and offering improved reliability in use.

To achieve this, according to a feature of the invention, the locking means comprises at least one jaw structure having externally at least one tooth which is intended to cooperate with indentations formed in an inside wall of the outer ferrule structure, and having internally a ramp surface adapted for cooperation with said cam surface which is formed on the inner ferrule structure.

Locking means are of course known for mechanical controls by cable embodying at least one radially expansible jaw, particularly from the documents GB-A-2, 016, 634 and EP-A-0, 048, 620. In said known devices, however, the jaw cooperates with a fixed external ramp surface, and meshes with indentations formed on the end of the sheathing conduit and the arrangement of the indentations on the end of the conduit requires these indentations to be formed either on a relatively long additional ferrule structure, which is costly to make and to mount so that it remains perfectly centered, or by means of a special helical armour of the conduit, increasing the cost of manufacture of the whole control without ensuring proper centering, in a general arrangement which also does not ensure the sealing which is desirable for this type of mechanical control.

According to another feature of the invention, the jaw structure is carried by a cage which surrounds the inner ferrule structure forming the cam surface and is joined to the control member, the cage and the control member being formed advantageously as a single piece, typically made of plastic material, as also the jaw structure.

Other features and advantages of the present invention will emerge from the following description of embodiments, given by way of illustration but not limiting in any way, with reference to the accompanying drawings, in which:

FIG. 1 is a diagrammatic view in longitudinal section of a first embodiment of a cable control according to the invention shown in the relaxed or unlocked condition;

FIG. 2 is a perspective view of a cage/jaw structure/control member assembly of the device shown in FIG. 1; and FIG. 3 is a view similar to FIG. 1 showing a second embodiment of a cable control according to the invention.

The control according to the invention comprises, in a general manner, a length of actuating cable 1 sliding axially inside a cable sheathing conduit structure, the ends of the cable 1 being typically joined, respectively, to an actuating component, typically a pedal 2, and to an actuatable component, typically a clutch lever 3, provided with an appropriate return means 4. In the embodiments shown, the sheathing conduit of the cable 1 is divided into a first conduit portion 5 and a second conduit portion 6 which are separated axially. The end of the first conduit portion 5 is firmly fixed to an intermediate ferrule member 7 comprising a first cavity 8 in which the end of the first conduit portion 5 is housed and fixed, and a second cavity 9 in which is housed and fixed one end of an intermediate conduit portion 50, through which passes the cable portion 1 between the two conduit portions 5 and 6. An end body 10 of enlarged diameter and advantageously made of rigid plastic is mounted on the other end of the intermediate conduit portion 50, for example by over-moulding, the cable 1 also passing through the end body 10 whose front end (remote from the intermediate conduit portion 50) forms an external conical surface 11 converging forwardly. The end of the second conduit portion 6 is itself firmly fixed to an outer ferrule structure, given the general reference 12, having a tubular configuration, consisting typically of the assembly of two tubular casing portions and defining an oblong internal cavity 13 bounded peripherally by an inner cylindrical wall 14 of the second ferrule structure 12.

In accordance with the invention, this inner wall 14 of the outer ferrule structure 12 is formed on a major portion of its length with indentations 15 which are parallel or which take the form of helical threads of fine pitch. The end body 10 is housed in a cage, given the general reference 16 axially movably mounted in the cavity 13. In the embodiment in FIGS. 1 and 2, the cage comprises an annular front wall 17 and a rear sleeve 18 interconnected by longitudinal arms 19 which are angularly spaced and are arranged so as to leave between them longitudinal windows 20 in which at least one, typically at least two radially swingable jaw members 21 are arranged, the jaw members 21 being joined to the rear sleeve 18 by longitudinal flexible fingers 22. Advantageously, the front wall 17, the arms 19, the rear sleeve 18, the jaw members 21 and the fingers 22 are made as a single piece out of flexible plastic material, for example polyacetal or nylon. The cage 16 is completed by a rear annular wall 23 which is mounted onto the sleeve 18, and which consists for example of a cover which is snap-fitted to this rear sleeve 18 as shown in FIG. 1. The front wall 17 and the rear wall or cover 23 are provided with central holes allowing the cable 1 and the intermediate conduit portion 50, respectively, to pass freely therethrough, but forming stop shoulders for the axially opposed ends of the end body 10 thus making it captive in the cage. The cage 16 is joined to a cylindrical friction control member 24 of the type described in U.S. Pat. No. 4,464,950 mentioned above which cooperates with the cable 1 in frictional engagement determined by a metal clamping ring 25. The cage 16 and the friction member 24 are advantageously made as a single piece.

In accordance with the invention, each jaw member 21 is formed externally with at least one tooth, typically several teeth, 26 shaped so as to correspond with the indentations 15 of the inner wall 14 of the outer ferrule structure 12, and internally with a ramp surface 27 shaped so as to correspond with the external conical surface 11 of the end body 10. At rest, owing to the elasticity of the fingers 22, the jaws normally occupy the position shown in FIGS. 1 and 2, that is to say an unlocked condition in which the two ferrule structures 7-50-10 and 8 are able to move axially relative to one another. However, as a result of a relative movement, particularly under the effect of the friction member 24, of the cage relative to the end body 10, if the cone 11 comes into engagement with the ramp surfaces 27, the jaws 21 are moved radially outwards so as to come in meshing engagement with the indentations 15 of the second outer ferrule structure 12, thus immobilizing these two ferrule structures relative to one another.

The control further comprises a spreading adjustment spring 28 between a flange 29 of the intermediate ferrule member 7 and the adjacent end of the outer ferrule structure 12, a bellows 30 being provided between this adjacent end of the outer ferrule structure 12 and the intermediate ferrule member 7 so as to ensure perfect sealing of the mechanical control. In case the indentations 15 are formed by quarter-turn moulding, it is possible to provide longitudinal grooves 31 in the inner wall 14 of the outer ferrule structure 12; the longitudinal grooves 31 interrupt the indentations 15, as shown in FIG. 1, and are intended to accept external pegs, such as 32, of the cage 16 so as to ensure perfect indexing in rotation of the cage 16 inside the outer ferrule structure 12, and thus perfect indexing between the teeth 26 of the jaw members 21 and the indentations 15 of the inside wall 14 of this second ferrule structure 12, which may by made of rigid plastic or eventually of light alloy.

There is shown in FIG. 3 another embodiment of the the invention, wherein the same or analogous components have the same reference numerals, possibly with a prime, as in FIG. 1. This second embodiment differs essentially from the preceeding one as regards the cage and the jaws. The jaws here consist of at least one, typically two diametrally opposed dogs 21' each mounted so as to slide radially in a corresponding radial opening 33 in the cylindrical cage 16'. An annular resilient ring 34, received in an outer groove 35 of each dog 21' biases radially the dogs inwardly of the cage in contact engagement with the cam surface 11 of the end body 10'. Here the cage 16' is devoid of the rear cover wall 23 which formed a rear stop for the end body, this end body 10' being held captive in the cage via a flange 36 at the front end of a front axially extending extension 37 of the body 10', this flange 36 adapted to cooperate in abutment engagement with the inner front end of the dogs 21'. In order to ensure a firm connection between the end of the intermediate conduit portion 50 and the end body 10', the latter is crimped on the conduit portion 50 via a metal crimping ring 38 surrounding a rear portion of reduced diameter of the end body 10'. In this embodiment, the indentations 15 are advantageously formed in the slightly radially recessed bottom of longitudinally extending grooves 39 which are formed in the inner wall 14 of the outer ferrule structure 12 and in which the cylindrical outer portions of the dogs 21' normally slightly protrude, whereby ensuring indexing of the dogs relative to the indentations and permitting to reduce the manufacture of these indentations to two angular sectors within the outer ferrule 12. In this embodiment also the friction control member 24 and the cage 16' are advantageously formed as a single piece out of a plastical material, as also the dogs 21', the outer ferrule 12 and the end body 10'-37-36.

The operation of the devices as described above is similar to that forming the subject of U.S. Pat. No. 4,464,950 mentioned above. Briefly, when at rest and the pedal 2 is not depressed, the control is in the configuration shown in FIG. 1, that is to say with the two ferrule structures able to move axially relative to one another under the effect of the adjustment spring 28 so as to recover any play which may exist in the mechanical control. However, as soon as the pedal 2 is depressed in order to actuate the component to be actuated 3, the cable 1 is moved to the right (in the Figures), drawing with it the friction member 24 and thus bringing the ramp surfaces 27 of the jaw members 21 to forcibly cooperate with the conical cam surface of the end body 10,10' so as to bring the jaw members 21 into meshing engagement with the indentations 15 to thereby firmly interconnecting the two ferrule structures (see FIG. 3), the locking being confirmed, after the frictional engagement of the friction member 24 has slipped on the cable 1 during the operation, by the reaction caused by this same operation between the two conduit portions 5 and 6 against the spring 28. When the pedal 2 is released, the cable 1 is returned by the return component 4 of the friction component 24 so as to unlock the locking means, the device then reoccupying the rest configuration shown in FIG. 1.

Although the present invention is described above in relation to particular embodiments, the invention is not limited by it, but on the contrary is capable of modifications and variants which will be apparent to a person skilled in the art. Thus, to reduct costs it is possible to eliminate the intermediate conduit member 50 and to fix firmly the end of the first conduit portion 5 directly to the end body 10, 10'. Similarly, still within the scope of the invention, the outer ferrule structure 12 may be mounted in a stationary wall, for instance adjacent the clutch lever, whereby the second conduit portion 6 may be suppressed.

I claim:

1. A mechanical control by a cable sliding in a sheathing conduit, comprising an automatic adjustment device including a releasable locking device interconnecting selectively and firmly together during actuation of the mechanical control an outer ferrule structure and an inner ferrule structure which is fixed firmly to one end of the conduit and housed telescopically in the outer ferrule structure, the ferrule structures biased axially apart relative to one another, the locking device comprising disengageable, radially expandable locking means arranged between the inner and outer ferrule structures and adapted for cooperation with a cam surface formed on one of said ferrule structures and movable between a locked position interconnecting firmly together the ferrule structures and an unlocked position under the action of a control member engaging frictionally the cable, said locking means comprising at least one jaw structure having externally at least one tooth to cooperate with indentations formed in an inside wall of the outer ferrule structure, and having internally a ramp surface to cooperate with said cam surface which is formed on the inner ferrule structure, the jaw structure carried by a cage surrounding the inner ferrule structure and associated with the control member, the inner ferrule structure being an end body of enlarged diameter having a portion with an external conical surface forming said cam surface, and the control member formed integral with the cage.

2. The control according to claim 1, wherein the device further comprises stop means carried by the cage and rendering the end body captive within the cage.

3. The control according to claim 1, wherein the jaw structure is mounted so as to slide radially in a radial opening in the cage and is associated with a spring member biasing the jaw structure radially inwardly of the cage.

4. The control according to claim 1, wherein the jaw structure is connected to the cage by a flexible finger.

5. The control according to claim 4, wherein the cage and the jaw structure are made of plastic material.

6. The control according to claim 5, wherein the end body is made of plastic material.

7. The control according to claim 6, wherein the control comprises a helical spring arranged axially between one end of the outer ferrule structure and an annular intermediate ferrule member joined to the end body and having a cavity for receiving the conduit end.

8. The control according to claim 7, wherein the inner ferrule structure is joined to one end of a first conduit portion of the conduit, the outer ferrule structure being joined to a second conduit portion of the conduit axially separated from the first conduit portion.

* * * * *